UNITED STATES PATENT OFFICE.

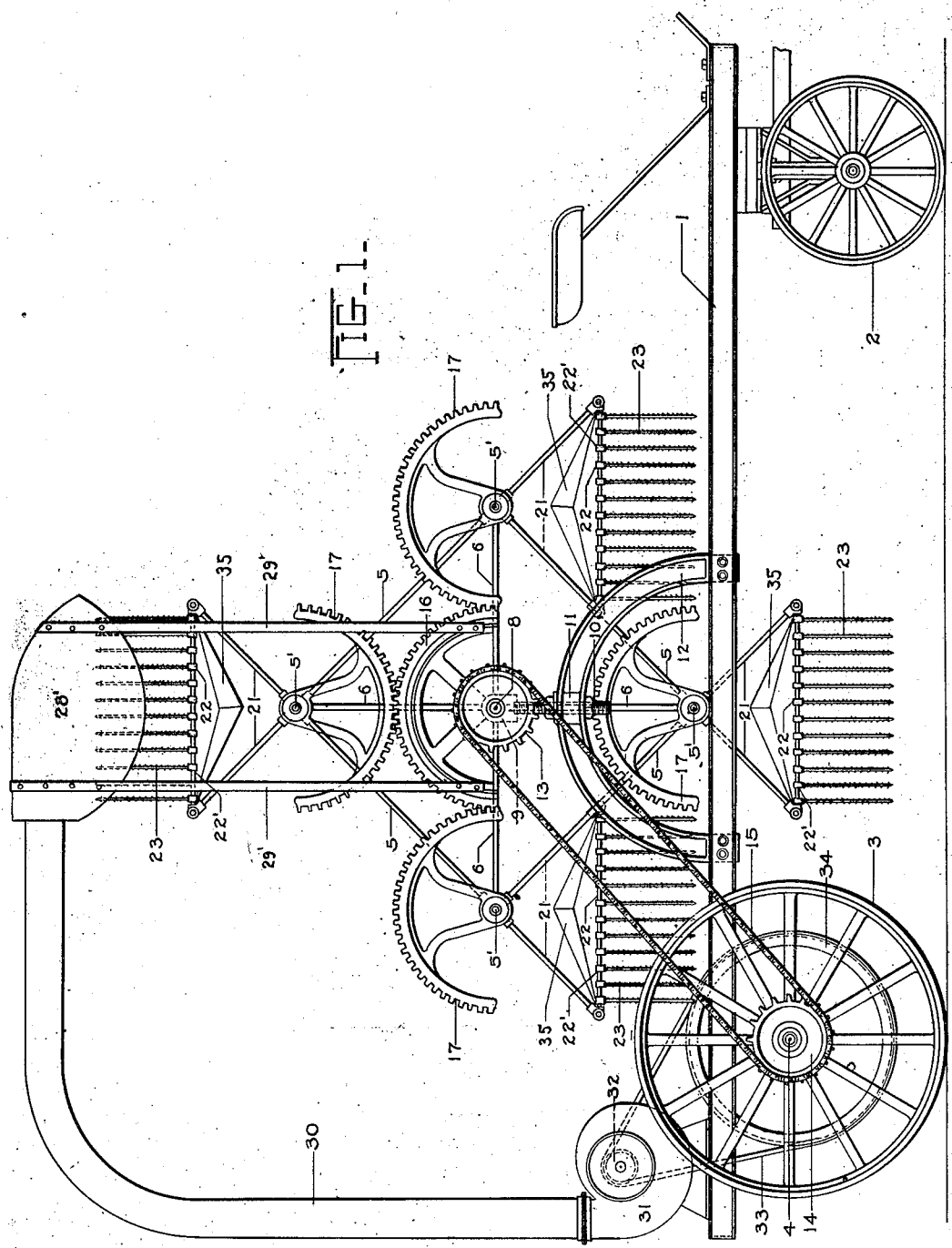

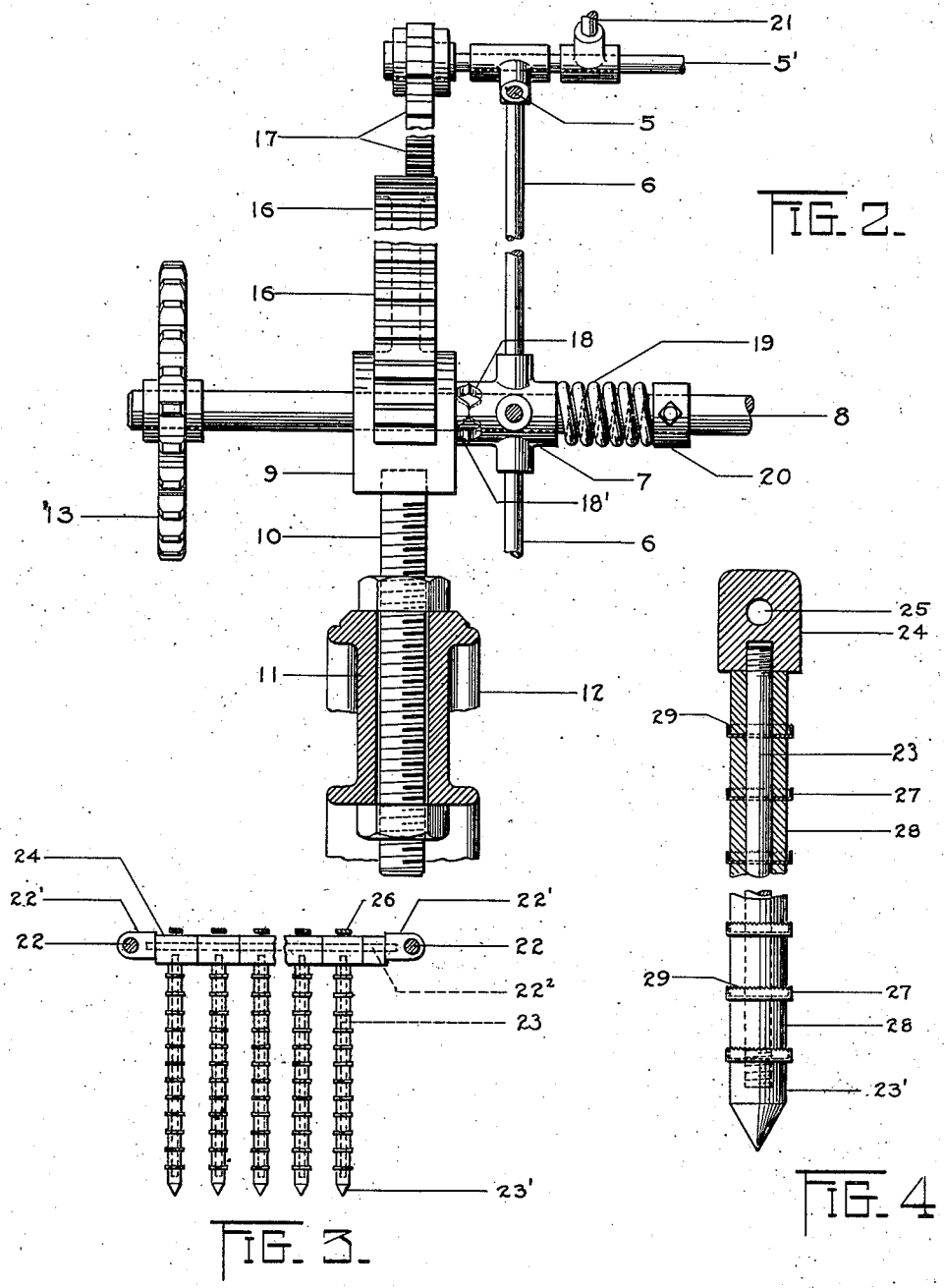

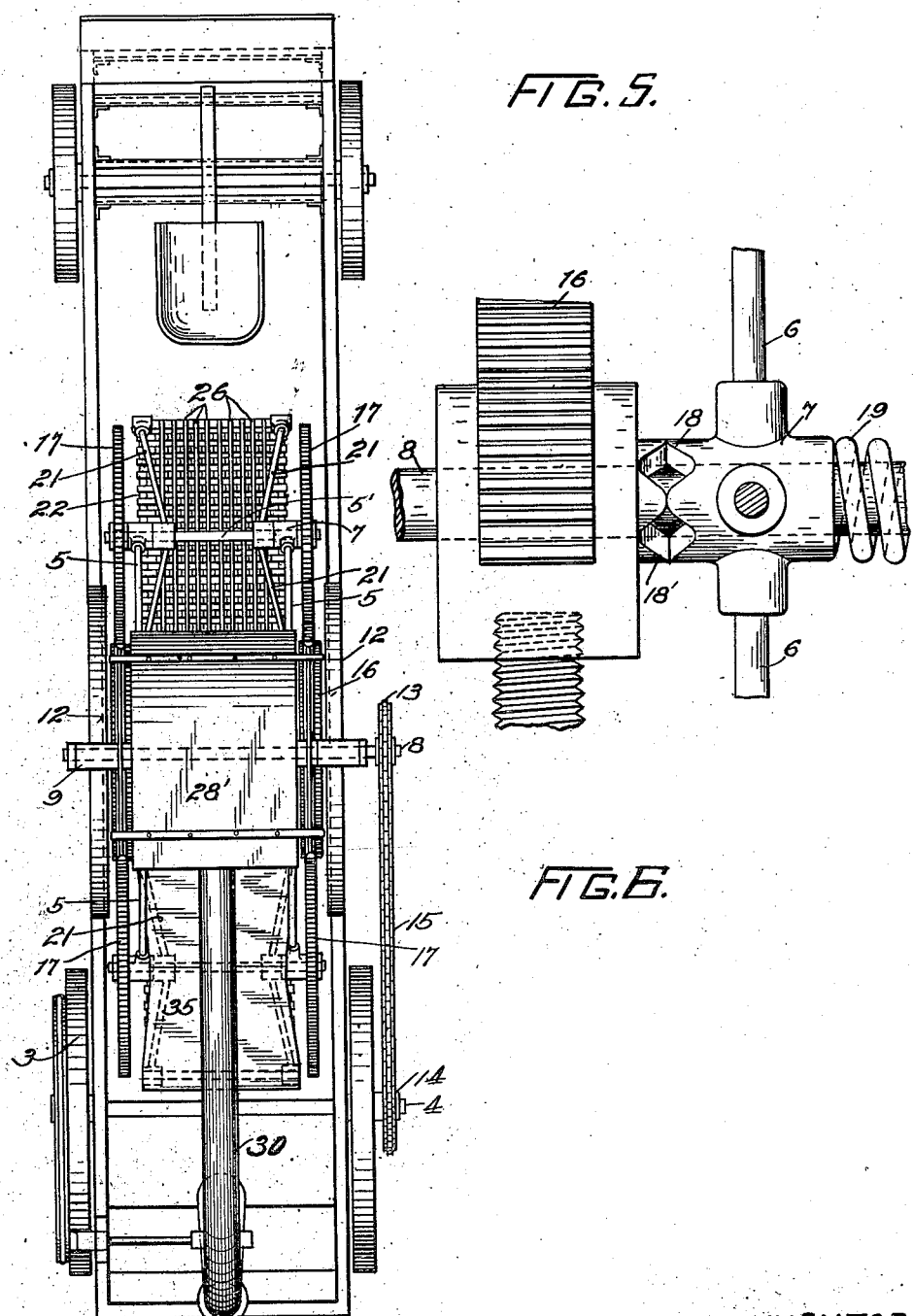

LEON WM. CAMPBELL, OF BOSTON, MASSACHUSETTS.

COTTON-HARVESTER.

1,277,851.   Specification of Letters Patent.   Patented Sept. 3, 1918.

Application filed January 9, 1915. Serial No. 1,446.

*To all whom it may concern:*

Be it known that I, LEON W. CAMPBELL, a citizen of the United States, residing at Boston, county of Suffolk, Commonwealth of Massachusetts, have invented certain new and useful Improvements in Cotton-Harvesters, of which the following is a specification.

This invention relates to harvesters and particularly to a machine for harvesting cotton.

The mechanical harvesting of cotton has been rendered particularly difficult by the fact that the cotton plant does not admit of any but the most delicate careful handling. Most machines as have been heretofore devised have been open to the objection that in use they frequently damaged the cotton plants. As a result, a large percentage of the cotton crop is today still picked by hand.

To the end therefore of providing a cotton harvester which will pick the cotton without injuring the plant and without sacrificing anything of efficiency and speed to the requirement for careful handling of the plant, I have devised my present invention. In this invention, the cotton is picked by an arrangement of picker stem gangs which are mounted on a rotating carrier and successively lower among the plants. The gangs rotate about a horizontal axis and normally depend vertically downward whereby to successively enter among the plants vertically to strip the fibers from the bolls and are then vertically raised and inverted for doffing. The gangs are so geared that they are lowered and raised during an arc of movement at a rate equal to the travel of the machine through the field so that they do not exert a longitudinal drag on the plants but are simply raised with a vertical upward pull. This prevents damage to the plants while permitting an effective stripping of the cotton. The gangs are successively given a slight lateral movement during their rotation whereby to vary their travel through the plants in order to thoroughly cover the plants being picked, while the individual picker stems themselves are constructed with special reference to preventing damage to the plants without sacrificing anything of efficiency in stripping the cotton. These and various other features of advantage which will appear more fully hereinafter are secured by the machine forming the subject matter of the present invention.

The construction and operation of my device will be more fully disclosed in the specification that follows. In the drawings forming a part of that specification, I have shown as an illustrative embodiment, a form of picker which has proven satisfactory in use and well illustrates the principles of my invention. Throughout specification and drawings like reference numerals are correspondingly applied, and in these drawings:

Figure 1 is an elevation of a machine in accordance with my invention.

Fig. 2 is a detail view illustrating particularly the means for varying the gangs of picker stems both laterally and vertically, and Figs. 3 and 4 are detail views of the picker stems.

Fig. 5 is a plan view, omitting the forward tray.

Fig. 6 is a detail of the oscillating cam.

I have indicated at 1 the frame of a wheeled truck adapted to be drawn or propelled through the cotton field. The truck has front wheels 2 and rear wheels 3, which latter may have roughened treads to give proper traction. The various rotating parts of the machine are driven from the axle 4 of the wheels 3.

The carrier for the picker stem gangs rotates about a horizontal axis and is driven from the rear axle. In the form of my invention selected as an illustration, this carrier consists of a light open frame structure from which the picker stem gangs are loosely hung for a fore and aft swing, relating to the line of travel of the harvester.

In the preferred form of my invention, the carrier consists of a series of four diagonal rods 5 arranged in the form of a square at each side of the machine and support a series of tie rods $5^1$, Fig. 2, extending transversely of the machine. The rods 5 are braced by a series of radial rods 6 connecting the rods 5 at their points of interesction with each other. All rods may be simple tubing connecting by suitable T, cross, or other fittings, or they may be light solid rods rigidly connected with each other. The rods 6 are received in crosses 7 at their inner ends and the crosses 7 are keyed on the main shaft 8 of the machine so as to be capable of slight longitudinal movement therealong.

The shaft 8 is journaled at each side of the machine in bearings 9 carried on the upper ends of a pair of supporting rods 10. The rods 10 are received in suitable bosses 11 formed on curved supporting members 12 rising from the sides of the frame 1. Where an adjustment for height of the picker stem gangs is considered desirable, the rods 10 are threaded near their upper ends and the bosses 11 have internal threads. Obviously, however, any suitable form of support, adjustable or otherwise, for the shaft and carrier may be used.

The shaft 8 is rotated in any desired manner. It is desirable, however, that this shaft shall rotate at a speed substantially equal to the speed of the wheels of the machine in order that the picker stem gangs may be moved through the plants without exerting a drag on the plants. The shaft 8 is therefore connected with the rear axle 4 by a pair of sprockets 13 and 14 and a chain 15.

Fast on each of the bearings 9 for the shaft 8 is the hub of a segmental gear 16 which successively meshes with a series of similar gears 17 spaced equi-distantly about the shaft 8 on the rotating carrier whereby to successively reverse or invert each picker stem gang after the picking phase of its revolution for doffing and to then restore said gangs to original position.

It is desirable to impart a slight endwise movement to the picker stem gangs during the picking phase of their revolution in order to shift the stem series laterally so as to completely cover all the area to be picked before the gangs are finally raised from the plants. This may conveniently be effected by vibrating the carrier as a whole laterally. For this purpose, I mount or form a cam 18 at one side of the cross 7, Fig. 2, on the shaft 8 and a cam $18^1$ on the fixed bearing 9. The cam 18 has an undulating face forming a plurality of cam points, in the present case, four, which successively strike the spaced cam points of the cam $18^1$ when the shaft 8 rotates. This causes a slight longitudinal movement of the cross 7, upon which the cam 18 is formed or bears, longitudinally along the shaft 8 and a corresponding movement of the carrier and thus the picker stem gangs endwise inward. The endwise movement of the cross 7 is resisted by a spring 19 confined about the shaft 8 between the cross 7 and a collar 20 fixed on the shaft. The spring returns the cross to original position after each endwise actuation. To allow for this endwise movement of the carrier and its gear segments 17, the gear segment 16 is of slightly greater width than the segments 17. This prevents the segments 16 and 17 being thrown out of mesh during this movement.

The gangs of picker stems are loosely suspended from the rods $5^1$ near their points of juncture with the rods 5. At each side of the machine, the rods $5^1$ have a pair of diverging rods 21 from which the picker stems are hung. The rods 21 have at their outer ends fittings which support a plurality of longitudinally extending rods 22. The rods 22 have fittings $22^1$ in which are received a plurality of transversely extending rods $22^2$. The rods $22^2$ have yokes 24 with rod holes 25 loosely depending therefrom into which are threaded or otherwise secured the upper ends of series of picker stems 23 which extend in parallel rows transversely across the machine from side to side. The yokes are prevented from too free tilting by a plurality of flat bars 26 arranged above their top faces and extending transversely across the machine, Figs. 3 and 4.

The individual picker stems 23 are constructed with special reference to preventing injury to the plants without detracting from the picking qualities of the stems. Each picker stem is in the form of a solid rod having a plurality of annular members 27 held thereon in superimposed relation and spaced from each other by suitable collars 28. Each picker stem terminates at its lower end in a pointed ferrule $23^1$ which is screwed or otherwise fastened thereon. The purpose of the pointed ferrules is to permit the stems to descend among the plants without breaking them, as would be the case where the stems were squared or cylindrical at their lower ends. The upper faces of the members 27 are serrated to provide annular series of substantially vertically upwardly directed teeth 29 which engage and separate the cotton fiber from the bolls. This construction of picker and the manner of mounting the stem with a slight fore and aft swing on rods $22^2$ limited by the yokes 24 engaging stop bars 26 and a slight lateral play provides a construction which is sufficiently rigid to withstand bending or buckling stresses and yet is sufficiently flexible to pass limbs or other obstacles without breaking them.

In use, the machine is drawn or propelled through the cotton field. The rotation of the wheels causes the shaft 8 and thus the carrier to turn at substantially the same speed as the wheels. The gangs of picker stems are therefore first lowered vertically among the plants and then drawn up through them. At the same time, a slight endwise movement is imparted to the gangs by the cam 18 in order to fully comb every plant within the area covered by the stems. The continued rotation of the carrier raises the gang vertically from among the plants without drag and the gear segment 17 of that particular gang begins to mesh with the segment 16. This reverses or inverts the gang so that when the segments 16 and 17 are in the middle portion of their engagement the gang is completely inverted for doffing. The picker stem gang is returned to its original position in the final phase of its revolution by the segment 16.

The doffing of the cotton from the stems may be effected in any desired manner, as for example, by means of a blower. For this purpose, I support a blower head $28^1$ directly above the point where the gangs will be wholly inverted. The head $28^1$ is carried by supporting members $29^1$ fastened to the fixed segment 16, and is connected by a pipe 30 with a blower 31 on the frame of the machine. The blower 31 is driven in any suitable manner, as by the pulleys 32 and 34 and the belt 33 connecting the blower shaft with the rear axle 4. The cotton doffed from the picker stem gangs is blowed downward from the points 29 of the inverted pickers into suitable receptacles 35 located below the gangs (when inverted). The receptacles 35 are substantially transverse troughs which are inclined outwardly and direct the cotton into a bag or other container (not shown) at the side of the machine.

This cycle of operations is repeated, each picker stem gang being successively lowered into, drawn up through the plants, vibrated laterally during this phase, raised vertically, inverted, doffed and finally restored to original position in its final phase of rotation. Inasmuch as the gangs are rotated at a speed equal to the speed of the wheels of the machine, an undue drag on the plants is prevented.

Various modifications in the form and construction of my device may obviously be resorted to within the limits of the appended claims.

What I therefore claim and desire to secure by Letters Patent is:

1. In a cotton harvester, an invertible, traveling gang of relatively freely swinging cotton picking devices, and means for inverting said gang during a phase of its travel.

2. In a cotton harvester, a rotating carrier, a plurality of gangs of cotton picking devices rotating therewith and each gang freely pivoted thereon, and means for successively inverting said gangs during a phase of their rotation with the carrier.

3. In a cotton harvester, a rotating carrier, a gang of cotton picking devices rotating therewith, means for inverting said gang during a phase of its rotation, and pneumatic means for doffing cotton from the picking devices of said gang during said inverting phase.

4. In a cotton harvester, a rotating carrier, and a gang of cotton picking devices rotating therewith and having a picking phase in which it swings freely on the carrier, an inverting phase, and a restoring phase, and means for imparting vibratory movements to said gang during said picking phase.

5. In a cotton harvester, a rotating carrier, and a gang of cotton picking devices pivotally mounted thereon and rotating therewith and having a picking phase, an inverting and a restoring phase, a cam for imparting vibratory movements to said carrier during said picking phase.

6. In a cotton harvester, a rotating carrier, and a gang of cotton picking devices freely pivoted thereon and rotating therewith and having a cycle including a vertically raising phase, an inverted phase, and a restoring phase and means for causing said device to move in said cycle, and means for imparting lateral vibratory movements to said carrier during said lowering and raising phases.

7. In a cotton harvester, a rotating carrier, and a gang of cotton picking devices rotating therewith and carried thereby through a vertically lowering gravitating phase, a vertically raising gravitating phase, an inverting phase, and a restoring phase, means for imparting endwise movements to said gang during said lowering and raising phases, and means for doffing cotton from the picking devices of said gang during said inverting phase.

8. In a cotton harvester, a wheeled frame, a rotating carrier thereon, a picker stem gang swingingly and invertibly mounted on said carrier, and means for rotating said carrier at a speed substantially equal to the speed of the wheels of said frame so that the pickers enter and leave a bush substantially without longitudinal change of position due to the advance of the vehicle.

9. In a cotton harvester, a wheeled frame, a carrier on the frame rotated about a transverse horizontal axis, and a picker stem gang pivoted to freely swing in a vertical position thereon, means to invert the gang on its pivot on the carrier, and means for moving said gang rearwardly at a speed substantially equal to the speed of the wheels of the frame, whereby the pickers are moved up and down in a substantially vertical plane while picking.

10. In a cotton harvester, a wheeled frame, a rotating carrier thereon, a plurality of invertible picker stem gangs rotatively mounted on said carrier, means for rotating said carrier at a speed substantially equal to the speed of the wheels of said frame, means for successively inverting said gangs during a phase of their rotation, and pneumatic means for successively doffing cotton from said gangs during said inverting phase.

11. In a cotton harvester, a wheeled frame, a rotating carrier thereon, a plurality of invertible picker stem gangs rotatively and freely suspended on said carrier, means for rotating said carrier at a speed substantially equal to the speed of the wheels of said frame, means for imparting lateral vibratory movements to said carrier during the picking phase, means for successively inverting said gangs during a subsequent phase of their rotation, and means for doffing cotton from said gangs during their inverting phase.

12. In a cotton harvester, a wheeled frame, a rotating carrier thereon, a plurality of picker stem gangs freely pivoted on said carrier and rotative therewith, means for imparting lateral vibratory movements to said carrier during the picking phase, means for successively inverting said gangs on the carrier during a subsequent phase of their rotation, and means for doffing cotton from said gangs while in an inverted position.

13. In a cotton harvester, a wheeled frame, a rotating carrier thereon, a plurality of gravitating picker stem gangs connected to said carrier, means for rotating said carrier at a speed substantially equal to the speed of the wheels of said frame, means for successively inverting said gangs upon the carrier during a phase of their rotation, and means for doffing cotton from said gangs during their inverting phase.

14. In a cotton harvester, a wheeled frame, a rotating carrier thereon, a plurality of invertible picker stem gangs pivoted on said carrier and movable vertically to and from picking position, means for rotating said carrier at a speed substantially equal to the speed of the wheels of said frame, means for successively inverting said gangs during a phase of their rotation with the carrier, a blower head effectively disposed for successively doffing cotton from said gangs during their inverting phase, and a blower operatively connected with said head.

15. In a cotton harvester, a plurality of independent rotatable gravitating gangs of depending cotton picking devices, an inverting element, and a plurality of elements rotating with said gangs and arranged for successive engagement with said inverting element whereby to successively invert said gangs.

16. In a cotton harvester, a plurality of rotatable freely swinging gangs of cotton picking devices, a fixed element, a plurality of invertible elements rotating with said gangs and arranged for successive engagement with said fixed element whereby to successively invert said gangs, and means for imparting lateral vibratory movements to said gangs during their picking phase.

17. In a cotton harvester, a plurality of gangs of cotton picking devices, an inverting element, a plurality of invertible elements rotating with said gangs and arranged for successive engagement with said inverting element whereby to successively invert said gangs, means for imparting endwise movements to said gangs during their picking phase, and means for doffing said gangs during their inverting phase.

18. In a cotton harvester, a wheeled frame, a driven shaft, a carrier rotating with said shaft, a reversing element, a plurality of invertible elements rotating with said carrier and successively engaging said reversing element during a phase of their revolution, and a plurality of invertible picker stem gangs mounted on said carrier and successively inverted by the engagement of said elements, and means for successively doffing cotton from said gangs during said inverting phase.

19. In a cotton harvester, a wheeled frame, a shaft driven therefrom at a speed substantially equal to the speed of the wheels of said frame, a carrier rotating with said shaft, a reversing element, a plurality of invertible elements rotating with said carrier and successively engaging with said reversing element during a phase of their revolution, a plurality of invertible picker stem gangs mounted on said carrier and successively inverted by the engagement of said elements, means for imparting endwise movement to said gangs during a phase of their revolution, and means for successively doffing cotton from said gangs during said inverting phase.

20. In a cotton harvester, a wheeled frame, a driven shaft, a carrier rotating with said shaft, means for adjusting said carrier vertically, a reversing gear element, a plurality of invertible gear elements rotating with said carrier and successively meshing with said reversing element during a phase of their revolution, a plurality of invertible picker stem gangs mounted on said carrier and successively inverted by the engagement of said gear elements, a cam on said shaft for imparting endwise movement to said gangs during a phase of their revolution, and means for successively doffing said gangs during said inverting phase.

21. In a cotton harvester, a carrier for a plurality of picker stem gangs (23) consisting of a reel-like open frame composed of connected end members (9) having radial arms (6) and a plurality of diagonal brace members (5) for connecting said arms, and a series of parallel pivot shafts (5¹) journaled in the junctions of said braces (5) and arms (6) for carrying the gangs (23).

22. In a cotton harvester, a carrier for a plurality of picker stem gangs (23) consisting of a reel-like open frame composed of a plurality of connected end members (6—7), a plurality of brace members (5) for said end members, and sets of triangular frames (21) pivoted at the points of juncture of said end members and from which said picker stems are suspended.

23. In a cotton harvester, a rotating carrier having its axis transverse to the path of travel of the harvester, and cotton picking stems connected to said carrier so as to have to and fro movement thereon parallel to the path of travel.

24. In a cotton harvester, a carrier rotating on an axis transverse to the path of travel of the harvester, a frame swingingly connected to said carrier and parallel therewith and adapted for to and fro motion thereon parallel to the path of travel, said frame including a pair of parallel side rods and a series of parallel suspension rods connected at their ends to said rods, and picker stems pivotally mounted in sets upon said suspension rods.

25. In a cotton harvester, a rotating carrier, a pair of spaced end frames swingingly suspended thereon, transverse parallel suspension rods mounted on said end frames, a plurality of picker stems pivotally mounted upon said suspension rods, and means for limiting the swinging action of said stems on their supporting rods.

26. In a cotton havester, a plurality of rotatable gangs of cotton picking devices having successively a picking phase, an inverting phase, and a restoring phase, a reversing element, a plurality of invertible elements rotating with said gangs and arranged for successive engagement with said reversing element, whereby to successively invert said gangs and then to successively restore them to original position, means for imparting lateral vibratory movements to said gangs during said picking phase, and means for successively doffing cotton from said gangs during their inverting phase.

27. In a cotton harvester, a plurality of rotatable gangs of cotton picking devices having successively a vertically lowering phase, a vertically raising phase, an inverting phase, and a restoring phase, a reversing element, a plurality of invertible elements rotating with said gangs and arranged for successive engagement with said reversing element, whereby to successively invert said gangs and then to successively restore them to original position, a cam for imparting lateral vibratory movements to said gangs during their lowering and raising phases, and means for sucessively doffing cotton from said gangs during their inverting phase.

28. In a cotton harvester a plurality of rotatable gangs of cotton picking devices having successively a vertically lowering phase, a vertically raising phase, an inverting phase, and a restoring phase, a reversing gear segment, a plurality of invertible gear segments rotating with said gangs and arranged for successive engagement with said reversing gear segment whereby to successively invert said gangs and then to successively restore them to original position, means for imparting lateral vibratory movements to said gangs during their lowering and raising phases, and pneumatic means for doffing cotton from said gangs during their inverting phase.

29. In a cotton harvester, a wheeled frame a carrier rotating thereon at a speed equal to the speed of the wheels of said frame, a reversing element, a plurality of invertible elements arranged for successive engagement with said reversing element, a plurality of gangs of cotton picking devices mounted on said carrier and successively inverted by the engagement of said invertible elements with said reversing element, said gangs having a vertically lowering and vertically raising picking phase, means for imparting vibratory movements to said gangs during said picking phase, and means for successively doffing cotton from said gangs during said inverting phase.

30. In a cotton harvester, a rotating carrier, a plurality of suspension members loosely suspended therefrom, and a plurality of picker stems connected with said members.

31. In a cotton harvester, a rotating carrier, a plurality of yokes loosely suspended therefrom, a plurality of picker stems connected with said yokes, and a plurality of transverse bars arranged above said yokes and effective to prevent tilting thereof beyond a predetermined point.

32. In a cotton harvester, a series of traveling gangs of invertible cotton picking stems with picking units, means for inverting the gangs, means to doff the picked cotton while said gangs are in inverted position, and means disposed below the position of the inverted stems to collect the cotton falling therefrom.

33. In a cotton harvester, a plurality of parallel movably connected gangs of picker stems each movable through a cycle including a picking phase and a doffing phase, the gangs being in vertical positions respectively in said phases, and means interposed between the gangs of stems in the picking phase and those in the doffing phase to receive the picked cotton falling from the doffing stems.

34. In a cotton harvester, a plurality of parallel, movably connected gangs of picker stems, means for successively moving the gangs in vertical position down into and up through cotton bushes, means for successively inverting the gangs of stems to effect the doffing of the cotton picked, and means disposed below the doffing stems to receive the falling doffed cotton.

In testimony whereof I affix my signature in presence of two witnesses.

LEON WM. CAMPBELL.

Witnesses:
 GEO. B. RAWLINGS,
 MARION C. HOBBS.